US009220045B2

(12) United States Patent
Singh et al.

(10) Patent No.: US 9,220,045 B2
(45) Date of Patent: Dec. 22, 2015

(54) METHOD AND SYSTEM FOR REGULATING FREQUENT HANDOVER BY MOBILE DEVICES BETWEEN FEMTOCELLS

(71) Applicant: QUALCOMM Incorporated, San Diego, CA (US)

(72) Inventors: Damanjit Singh, San Diego, CA (US); Peerapol Tinnakornsrisuphap, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/773,550

(22) Filed: Feb. 21, 2013

(65) Prior Publication Data

US 2013/0225171 A1     Aug. 29, 2013

Related U.S. Application Data

(60) Provisional application No. 61/603,014, filed on Feb. 24, 2012.

(51) Int. Cl.
*H04W 36/00* (2009.01)
*H04W 36/24* (2009.01)
(Continued)

(52) U.S. Cl.
CPC ............ *H04W 36/245* (2013.01); *H04W 36/26* (2013.01); *H04W 36/32* (2013.01); *H04W 36/04* (2013.01); *H04W 84/045* (2013.01)

(58) Field of Classification Search
CPC ............ H04W 36/04; H04W 36/0083; H04W 36/0088; H04W 36/0094; H04W 36/30; H04W 84/045
USPC ......... 455/436, 437, 438, 439, 440, 441, 442, 455/444
See application file for complete search history.

(56) References Cited

U.S. PATENT DOCUMENTS 5,822,696 A * 10/1998 Bergkvist .............. H04W 36/04
455/436
5,884,176 A * 3/1999 Vaara .................... H04W 36/04
455/438
(Continued)

FOREIGN PATENT DOCUMENTS

EP     2117250 A1    11/2009
EP     2387279 A1    11/2011
(Continued)

OTHER PUBLICATIONS

Alcatel-Lucent et al: "On UE-speed-based methods for improving the mobility performance in HetNets", 3GPP Draft; R2-120652-Speed Based Methods for Improving Mobility Performance in HetNet, 3rd Generation Partnership Project (3GPP), Mobile Competence Centre; 650, Route Des Lucioles; F-06921 Sophia-Antipolis Cedex; France, RAN WG2, Dresden, Germany; 20120206-20120210, Jan. 31, 2012, XP050565503, [retrieved on Jan. 31, 2012].

(Continued)

*Primary Examiner* — Jean Gelin
(74) *Attorney, Agent, or Firm* — Fariba Yadegar-Bandari

(57) ABSTRACT

Disclosed are systems and methods for regulating frequent handovers by mobile devices between adjacent femtocells. In one aspect, the method includes determining if a mobile device is experiencing frequent handovers between femtocells, classifying frequent handovers based on cause (e.g., ping-pong between the two femtocells or high speed mobile device crossing a number of femtocells, etc.), and determining one or more remedial actions for regulation of frequent handovers based on the number of frequent handovers and their classification.

62 Claims, 11 Drawing Sheets

(51) Int. Cl.
*H04W 36/26* (2009.01)
*H04W 36/32* (2009.01)
*H04W 36/04* (2009.01)
*H04W 84/04* (2009.01)

(56) References Cited

U.S. PATENT DOCUMENTS

| | | | |
|---|---|---|---|
| 8,219,094 B2 * | 7/2012 | Huber et al. | 455/436 |
| 8,843,131 B2 | 9/2014 | Patel et al. | |
| 2004/0067754 A1 * | 4/2004 | Gao | H04W 28/26 455/442 |
| 2004/0137902 A1 * | 7/2004 | Chaskar | H04W 36/30 455/436 |
| 2005/0075110 A1 * | 4/2005 | Posti | H04L 1/0002 455/452.1 |
| 2005/0255847 A1 * | 11/2005 | Han | H04W 36/30 455/436 |
| 2006/0094423 A1 | 5/2006 | Sharma et al. | |
| 2006/0182060 A1 * | 8/2006 | Lin et al. | 370/331 |
| 2008/0305835 A1 | 12/2008 | Johnstone et al. | |
| 2009/0275334 A1 | 11/2009 | Xie et al. | |
| 2010/0027510 A1 | 2/2010 | Balasubramanian et al. | |
| 2010/0203890 A1 | 8/2010 | Nagaraja et al. | |
| 2010/0220597 A1 | 9/2010 | Ji et al. | |
| 2010/0232389 A1 * | 9/2010 | Park | 370/331 |
| 2010/0240368 A1 | 9/2010 | Fox et al. | |
| 2010/0273487 A1 | 10/2010 | Alonso-Rubio et al. | |
| 2010/0304745 A1 | 12/2010 | Patel et al. | |
| 2010/0331000 A1 | 12/2010 | Zhu et al. | |
| 2011/0026492 A1 | 2/2011 | Frenger et al. | |
| 2011/0092151 A1 | 4/2011 | Brisebois et al. | |
| 2011/0177808 A1 | 7/2011 | Grokop et al. | |
| 2011/0250891 A1 | 10/2011 | Zou et al. | |
| 2011/0263260 A1 | 10/2011 | Yavuz et al. | |
| 2011/0300863 A1 | 12/2011 | Iwata | |
| 2012/0088507 A1 | 4/2012 | Legg et al. | |
| 2012/0115423 A1 * | 5/2012 | Sang et al. | 455/75 |
| 2012/0115488 A1 | 5/2012 | Jiang et al. | |
| 2012/0129530 A1 * | 5/2012 | Larmo et al. | 455/436 |
| 2012/0178450 A1 * | 7/2012 | Kuru et al. | 455/436 |
| 2012/0214489 A1 * | 8/2012 | Koo et al. | 455/436 |
| 2012/0309356 A1 * | 12/2012 | Tan et al. | 455/411 |
| 2013/0115949 A1 * | 5/2013 | Centonza et al. | 455/436 |
| 2013/0225172 A1 | 8/2013 | Singh et al. | |
| 2013/0225182 A1 | 8/2013 | Singh et al. | |
| 2013/0273919 A1 * | 10/2013 | Sashihara et al. | 455/436 |
| 2013/0310044 A1 * | 11/2013 | Rakos et al. | 455/436 |
| 2014/0169336 A1 * | 6/2014 | Oh | H04W 36/0055 370/332 |
| 2014/0200004 A1 * | 7/2014 | Wegmann et al. | 455/436 |

FOREIGN PATENT DOCUMENTS

| | | |
|---|---|---|
| JP | 2004088695 A | 3/2004 |
| WO | 2008020280 A1 | 2/2008 |
| WO | 2011048410 A1 | 4/2011 |
| WO | 2011140523 A1 | 11/2011 |

OTHER PUBLICATIONS

International Search Report and Written Opinion—PCT/US2013/027477—ISA/EPO—May 23, 2013.

Mediatek Inc: "Discussion on short stay problem", 3GPP Draft; R3-1 12879_Discussion on Short Stay Problem, 3rd Generation Partnership Project (3GPP), Mobile Competence Centre; 650, Route Des Lucioles; F-06921 Sophia-Antipolis Cedex; France, RAN WG3, San Francisco, USA; 20111114-20111118, Nov. 5, 2011, XP050566220, [retrieved on Nov. 5, 2011].

Nokia Siemens Networks et al: "UE MSE and HetNet Mobility", 3GPP Draft; R2-120524JV1SE and HetNet Moblity, 3rd Generation Partnership Project (3GPP), Mobile Competence Centre; 650, Route Des Lucioles; F-06921 Sophia-Antipolis Cedex; France, RAN WG2, Dresden, Germany; 20120206-20120210, Jan. 31, 2012, XP050565427, [retrieved on Jan. 31, 2012].

Zte, "Identify Mobility States of a UE based on UE History Information," 3GPP TSG RAN WG3 #65bis, R3-092295, Miyazaki, Japan, Oct. 12-15, 2009, pp. 1-2.

Renesas Electronics Europe Ltd: "Improvements to Mobility State Estimation Procedure", 3GPP Draft; R2-120350 Improvements to MSE Procedure, 3rd Generation Partnership Project (3GPP), Mobile Competence Centre; 650, Route Des Lucioles; F-06921 Sophia-Antipolis Cedex; France, vol. RAN WG2, No. Dresden, Germany; 20120206-20120210, Jan. 31, 2012, XP050565376, [retrieved on Jan. 31, 2012] Background; p. 1, paragraph 2 Signalling UE MSE state to network on RRC_CONNECTED transition; p. 5, paragraph 4.3 Indicating different HO margins for different MSE states in RRC_CONNECTED; p. 5, paragraph 4.4—p. 6.

3GPP TS 25.413: "3rd Generation Partnership Project; Technical Specification Group Radio Access Network; UTRAN lu interface Radio Access Network Application Part (RANAP) signalling (Release 9)", V9.1.0, Dec. 2009, pp. 1-401.

3GPP TS 36.413: "3rd Generation Partnership Project; Technical Specification Group Radio Access Network; Evolved Universal Terrestrial Radio Access Network (E-UTRAN); S1 Application Protocol (S1AP) (Release 10)", V10.3.0 (Sep. 2011), pp. 1-254. See UE History Information Section 9.2.1.43.

* cited by examiner

METHOD AND SYSTEM FOR REGULATING FREQUENT HANDOVER BY MOBILE DEVICES BETWEEN FEMTOCELLS

CLAIM OF PRIORITY UNDER 35 U.S.C. §119

The present application for patent claims priority to Provisional Application No. 61/603,014 entitled "Handover by Mobile Devices Between Femtocells" filed on Feb. 24, 2012, and assigned to the assignee hereof and hereby expressly incorporated by reference herein.

BACKGROUND

1. Field

This disclosure relates generally to the field of communications and more specifically to the system and methods for regulating frequent handover by mobile devices between femtocells.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ect.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional low power base stations can be deployed to provide more robust wireless coverage to mobile devices. For example, low power base stations (e.g., which can be commonly referred to as Home NodeBs or Home eNBs, collectively referred to as H(e)NBs, femto nodes, femtocell nodes, pico nodes, micro nodes, etc.) can be deployed for incremental capacity growth, richer user experience, in-building or other specific geographic coverage, and/or the like. In some configurations, such low power base stations are connected to the Internet via broadband connection (e.g., digital subscriber line (DSL) router, cable or other modem, etc.), which can provide the backhaul link to the mobile operator's network. In this regard, low power base stations are often deployed in homes, offices, etc. without consideration of a current network environment.

In a femtocell deployment, due to small coverage area of femtocells, an active high speed mobile device may go through frequent handovers between adjacent femtocells. Additionally, even a stationary or slow moving mobile device can experience frequent handovers due to channel fading if the mobile device is present at a location where pilot signals from different femtocells are about the same strength (i.e., pilot pollution). These frequent handovers between femtocells are undesirable as they can cause packet losses, leading to voice artifacts and/or packet delays and/or poor user experience, as well as increase signaling load at the femtocell nodes and/or core network. Thus, it is desirable to regulate such frequent mobile device handovers in femtocell deployment.

SUMMARY

The following presents a simplified summary of one or more aspects of mechanisms for regulating frequent handover by mobile devices between femtocells. This summary is not an extensive overview of all contemplated aspects of the invention, and is intended to neither identify key or critical elements of the invention nor delineate the scope of any or all aspects thereof. Its sole purpose is to present some concepts of one or more aspects in a simplified form as a prelude to the more detailed description that is presented later.

In general, the systems and methods disclosed herein provide mechanisms for regulating frequent handovers by mobile devices between adjacent femtocells. In one aspect, the method includes determining if a mobile device is experiencing frequent handovers between femtocells, classifying frequent handovers based on cause (e.g., ping-pong between the two or more femtocells, high velocity mobile device crossing a number of femtocells, etc.), and determining one or more remedial actions for regulation of frequent handovers based on the number of frequent handovers and their classification. As used in this application, the source femtocell is a femtocell that is trying to handover the mobile device to another femtocell; and the target femtocell is a femtocell to which the source femtocell is trying to handover the mobile device.

In another aspect, the method for regulating handovers between femtocells, includes monitoring handovers between femtocells by a mobile device and adjusting one or more parameters associated with the triggering of handovers for that mobile device based on monitoring. The method further includes continue monitoring subsequent handovers of the mobile device and re-adjusting one or more parameters associated with the triggering of handovers for that mobile device based on the continued monitoring of subsequent handovers of the mobile device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
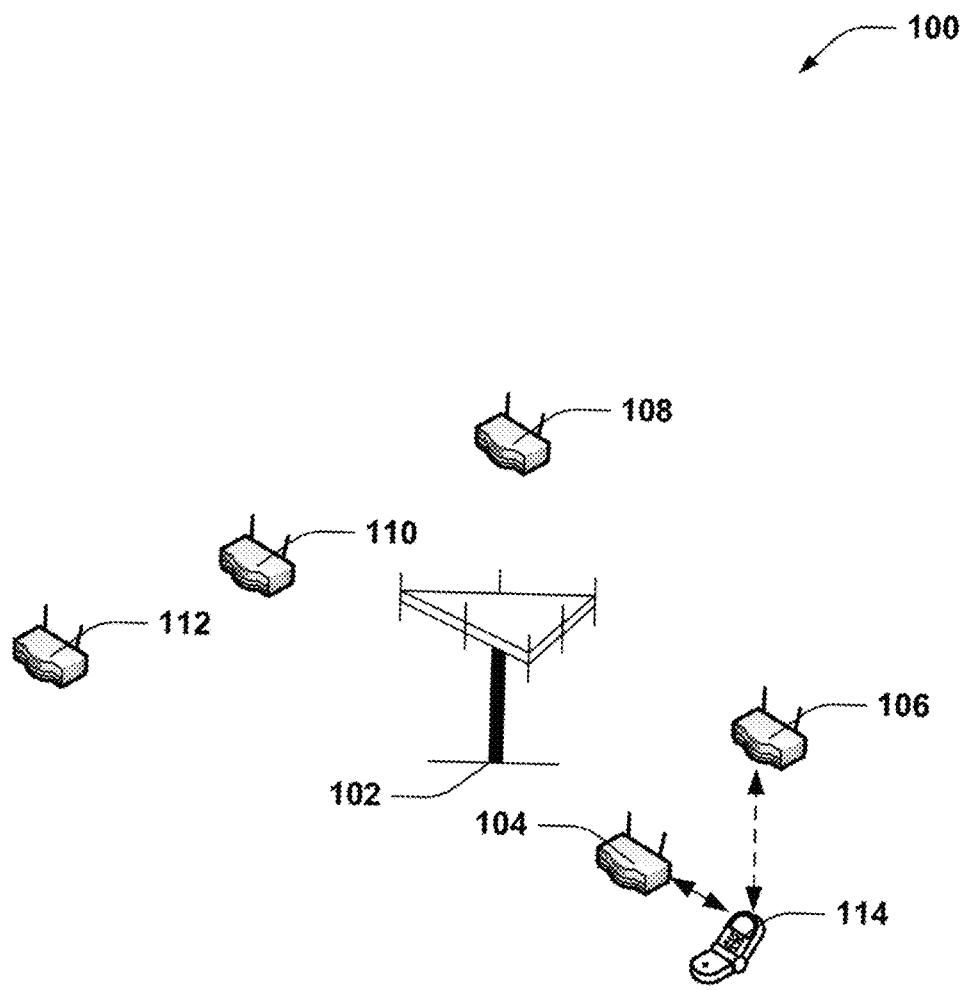
FIG. 1 is a block diagram of an example system that facilitates regulation of frequent handovers between femtocells.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

In various aspects, disclosed herein systems and methods for regulating frequent handovers by mobile devices between adjacent femtocells. As generally known in the art, a mobile device can also be called a system, device, subscriber unit, subscriber station, mobile station, mobile, remote station, mobile terminal, remote terminal, access terminal, user terminal, terminal, communication device, user agent, user device, or user equipment (UE). A mobile device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected via a wireless modem to one or more base stations (BS) that provide cellular or wireless network access to the mobile device.

A base station (BS) may be utilized for communicating with mobile devices(s) and may also be referred to as an access point, femto node, a pico node, micro node, a Node B, evolved Node B (eNB), home Node B (HNB) or home evolved Node B (HeNB), collectively referred to as H(e)NB, or some other terminology. These base stations are generally considered to be low-power base stations. For example, a low-power base station transmits at a relatively low power as compared to a macro base station associated with a wireless wide area network (WWAN). As such, the coverage area of the low power base station can be substantially smaller than the coverage area of a macro base station.

The techniques described herein may be used for various wireless communication systems such as CDMA, TDMA, FDMA, OFDMA, SC-FDMA, WiFi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 shows an example wireless communication system 100. System 100 includes a macro base station 102 that can provide one or more devices with access to a wireless network, as well as a plurality of femto nodes 104, 106, 108, 110, and 112, which can also provide wireless network access over a backhaul link (not shown) with a mobile network over a broadband internet connection. In one example, femto nodes 104, 106, 108, 110, and/or 112 can be other types of low power base stations, a relay node, a device (e.g., communicating in peer-to-peer or ad-hoc mode with other devices), etc. Each femto node forms a femtocell (not shown in FIG. 1, but described in greater detail below with reference in FIG. 9). Moreover, system 100 comprises a mobile device 114 that communicates with one or more of the femto nodes 104 and/or 106 to receive wireless access to the mobile network.

In the depicted femtocell deployment, due to small coverage area of each femtocell, an active high velocity mobile device 114 may go through frequent handovers between adjacent femtocells (e.g., femto nodes 104, 106, 108, 110, and 112). Additionally, even a stationary or slow moving mobile device 114 can experience frequent handovers due to channel fading if it is present at a location where pilot signals from different femto nodes are about the same strength (i.e., pilot pollution). These frequent handovers between femtocells are undesirable as they can cause packet losses, leading to voice artifacts and/or packet delays and/or poor user experience, as well as increase signaling load at a femto nodes and/or core network. Thus, it is desirable to regulate such frequent mobile device handovers between femtocells.

Figure 2:
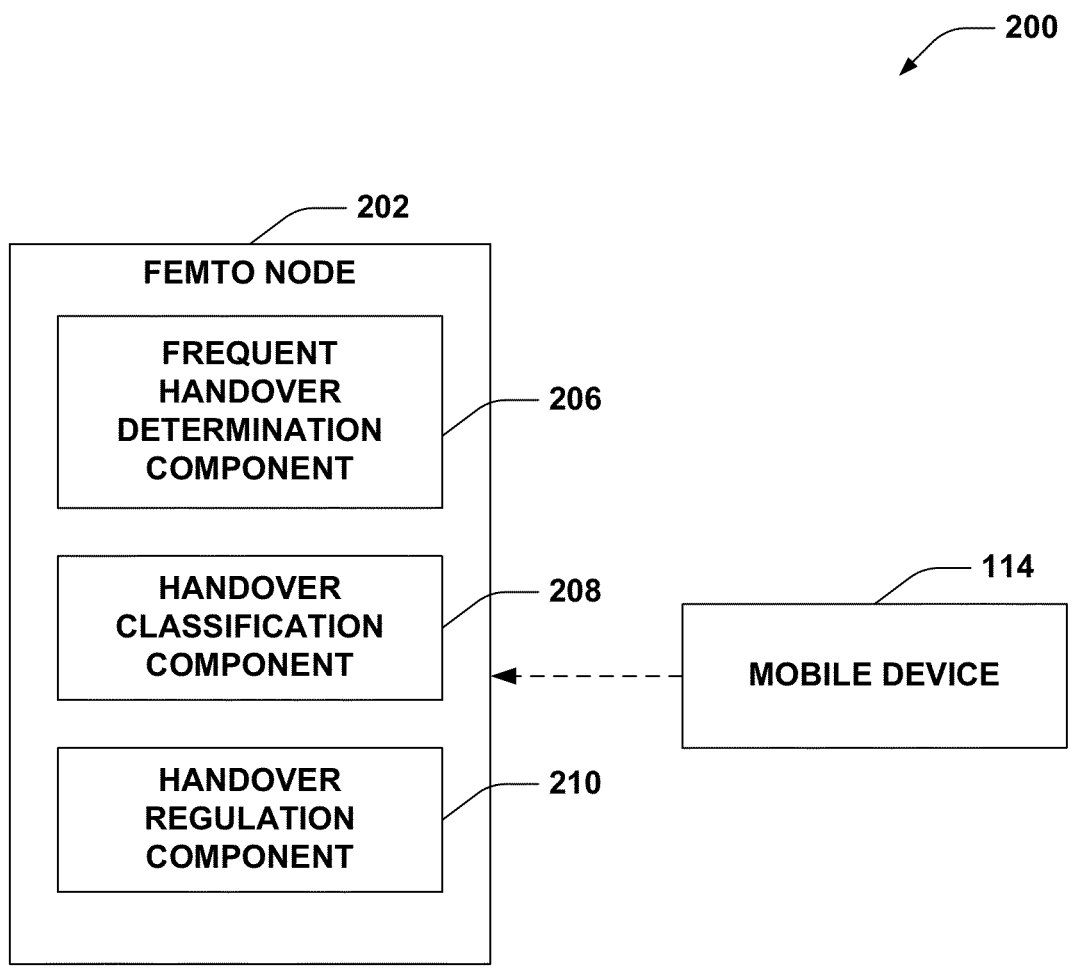
FIG. 2 is a block diagram of an example system that facilitates regulation of frequent handovers between femtocells according to one aspect.

FIG. 2 illustrates an example system 200 for regulating frequent mobile device handovers between adjacent femtocells. System 200 includes a femto node 202, which can be substantially any low power base station, and can, in one example, include one or more of femto nodes 104, 106, 108, 110, and/or 112 (FIG. 1), as described herein. In general, the femto node 202 includes a frequent handover determination component 206, a handover classification component 208 and a handover regulation component 210. Each of the components will be described in greater detail herein below.

The frequent handover determination component 206 is configured to determine whether the mobile device 114 which became recently connected to the femto node 202 as a result of handover from an adjacent femto node is subject to a frequent handover. Alternatively, the frequent handover determination component 206 can be configured to determine whether the mobile device 114, which is connected to the femto node 202, but is going connect to an adjacent femto node as a result of handover is subject to a frequent handover. In one aspect, to determine whether the mobile device 114 undergoes a frequent handover, the component 206 of femto node 202 may be configured to obtain mobile device handover information. For example, in UMTS/LTE systems, the device handover information can be obtained from "UE History Information" information element (IE), which can be passed during the handovers from the source femtocell to the target femtocell. This IE contains information for the femtocells (e.g., up to 16) that a mobile device has been served by in active state prior to the target cell. For each of these cells, this IE contains cell identity, cell type (e.g., macro, femto, etc.) and the time mobile device stayed in that cell.

Having obtained the mobile device handover history information, the frequent handover determination component 206 may perform one of several mechanisms for determining whether the mobile device 114 is subject to frequent handover. In one aspect, component 206 may determine frequent handover based on an average time spent by mobile device on past femtocells. For example, component 206 may calculate average time that the mobile device stayed in each femtocell over the last '$n_1$' cells, where '$n_1$' is a parameter that can be optimized. Furthermore, equal or unequal weights may be given to the time spent by the mobile device in each cell, while taking the average. Then, if the frequent handover determination component 206 determines that that the calculated 'average handover time' is less than a certain threshold parameter (e.g., a couple of seconds), then it may be concluded that the mobile device 114 is going through frequent handovers. The threshold parameter for determining if the handovers are considered "frequent" may be selected based on simulation, system requirements, impact on user experience, number of dropped calls by the mobile terminal due to handovers, degradation in quality of service provided by the system (e.g., degradation in quality of streaming audio/video content) or other criteria.

In another aspect, the frequent handover determination component 206 may determine frequent handover based on a time spent by mobile device on one or more femtocells. For example, component 206 may check for a last '$n_2$' cells if in each cell time spent under a cell <$T_{min}$ where $T_{min}$ is a time threshold below which a handover can be considered as a fast handover. The $T_{min}$ parameter may be selected based on simulation, system requirements, impact on user experience, number of dropped calls by the mobile terminal due to handovers, degradation in quality of service provided by the system (e.g., degradation in quality of streaming audio/video content) or other criteria. If component 206 determines that out of '$n_2$' last handovers, '$x_2$' were fast handovers, then the mobile device is considered going through frequent handovers. Parameters '$n_2$' and '$x_2$' can be chosen based on algorithm requirements. In one aspect, if '$x_2$'='$n_2$', then it implies that all last handovers should be considered fast handovers.

In one aspect, the component 206 may choose either one of the described frequent handover determination schemes or a combination of these or other schemes.

In another aspect, the frequent handover determination component 206 may be further configured to divide frequent handovers into different sub-categories. For example, one category could be of 'very fast/frequent' handovers, where impact to the user experience is very significant. The other category could be just 'fast/frequent' handovers, where impact to the users is undesirable but not as significant as 'very fast/frequent' handovers. For each sub-category, the component 206 may choose either one of the described frequent handover determination schemes or a combination of these or other schemes.

Having determined that the mobile device 114 is going through frequent handover, the system 202 may use handover classification component 208 to classify a type or presumed cause of the frequent handover. In one aspect, the frequent handovers may be classified as a ping-pong handovers or a fast moving handovers. This classification is not limiting and, in other aspects, different classes of frequent handovers may be used.

In one aspect, ping-pong handovers may occur for one or more of the following three reasons: 1) Mobile device 114 is at the edge of two femtocells and going through channel fading; 2) Mobile device 114 is in a pilot pollution area, where it can see number of pilot signals from different femto nodes with each pilot signal having approximately the same strength and there is channel fading or slow user mobility; and 3) Mobile device 114 is moving back and forth between two or more femtocells too quickly. Those of skill in the art will appreciate that there may be other reasons for ping-pong handovers.

Figure 3:
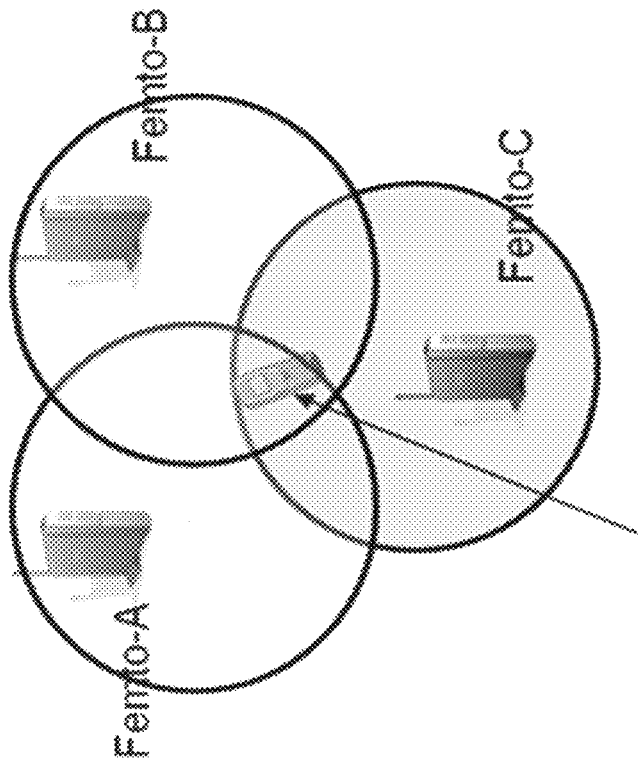
FIG. 3 is a diagram of an example system in which regulation of frequent handovers may be performed.
Figure 3:
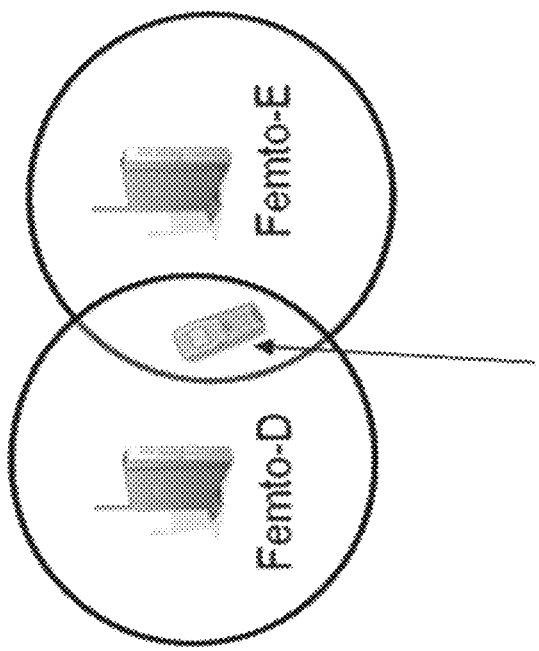

To determine whether the mobile device 114 is going through a ping-pong handover, the handover classification component 208 of system 202 may first identify past serving cells from the mobile device "UE History Information" IE. For example, 'Cell ID'/'PLMN identity' field in 'Last Visited UTRAN Cell Information' IE or 'Last Visited E-UTRAN Cell Information' IE can be used for this purpose. Then, component 208 may check one or more of the following conditions: Condition 1—check if the last '$n_p$' handovers have happened between the cells, which are RF neighbors of the current cell. The above condition takes care of the scenarios in which mobile device 114 is at the edge of the two femtocells or present in a pilot pollution area as shown in FIG. 3; and Condition 2—check if in the last '$n_p$' handovers, the cell identity of a cell has repeated '$x_p$' times. The component 208 may classify handovers as 'ping-pong' handovers if one or both of the above conditions are met. Those of skill in the art will appreciate that there may be other conditions that could be used to classify handovers as ping-pong handovers.

Fast moving handovers may happen due to high velocity mobile devices; for example, a vehicular mobile device, or a mobile device in a vehicle, may drive past coverage of a number of femtocells (e.g., femto nodes 104, 106, 108, 110, and/or 112 of FIG. 1). In one aspect, the handover classification component 208 may classify all handovers that do not meet the criteria 1 or 2 of the ping-pong handover, into the 'fast moving handovers' category.

Having classified the frequent handover as ping-pong handover or fast moving handover, the system 202 may use handover regulation component 210 to regulate handover of the mobile device 114. In one aspect, the component 210 may use the following rules/actions based on the determination and classification of frequent handovers:

If handovers are 'frequent handovers' and are classified as 'fast moving handovers', then femto node 202 can initiate inter-frequency or inter-RAT handover to a macrocell on the other carrier (e.g., a different RF channel) or radio technology. This handover can be either initiated based on mobile device measurement reports on the macrocell carrier or without measurement reports (e.g., a blind handover). In one aspect, the purpose of this type of regulation is to send the fast moving mobile device to a clean macrocell carrier where a number of handovers would be reduced due to large coverage of macrocells and availability of soft handover between macrocells.

If handovers are 'frequent handovers' and are classified as 'ping-pong handovers', then femto node 202 can make handover more difficult between the ping-ponging (or neighboring) cells, for this mobile device. For example, in UMTS, one way to achieve this would be by configuring parameters used for triggering handover events by the mobile device differently in the 'Measurement Control' message. For example, increasing the values of Hysteresis and Time-to-Trigger (TTT) parameters, delays triggering of handover events to all femtocells. Decreasing the value of Reporting Range Constant parameter may delay triggering of handover events to femtocells. Decreasing value of Cell Individual Offset (CIO) parameter for a femtocell may decrease the delay in triggering handover events for that cell. Other parameters may include, but not limited to, measurement identity, event identity, event type, measurement type, reporting interval, amount of reporting, threshold, filter coefficient, Use CIO, cells for measurement, compressed-mode parameters. The above list of parameters is not exhaustive and other parameters that triggering handover events both at the mobile device and femto node may be configured in other aspects.

Alternatively, femto node 202 can delay handover to the cells involved in ping-pong handovers. For example, after the mobile device 114 triggers an event used by femtocell for handover, it can ask the mobile device to continue reporting that cell for a longer than usual time to decide on handover. However, if delaying handovers to the ping-ponging cells does not work (e.g., frequent handovers continue), inter-frequency handover to the macrocell may be initiated by femto node 200 as described above.

In one aspect, if different sub-categories are used for 'frequent handovers', e.g., 'very fast/frequent' handovers sub-category and just 'fast/frequent' handovers sub-category, then classification of handovers may be ignored for some or all categories.

In another aspect, system 200 may use only 'frequent handovers' metric or only classification of handovers to decide on the handover regulation actions described above.

Figure 4A:
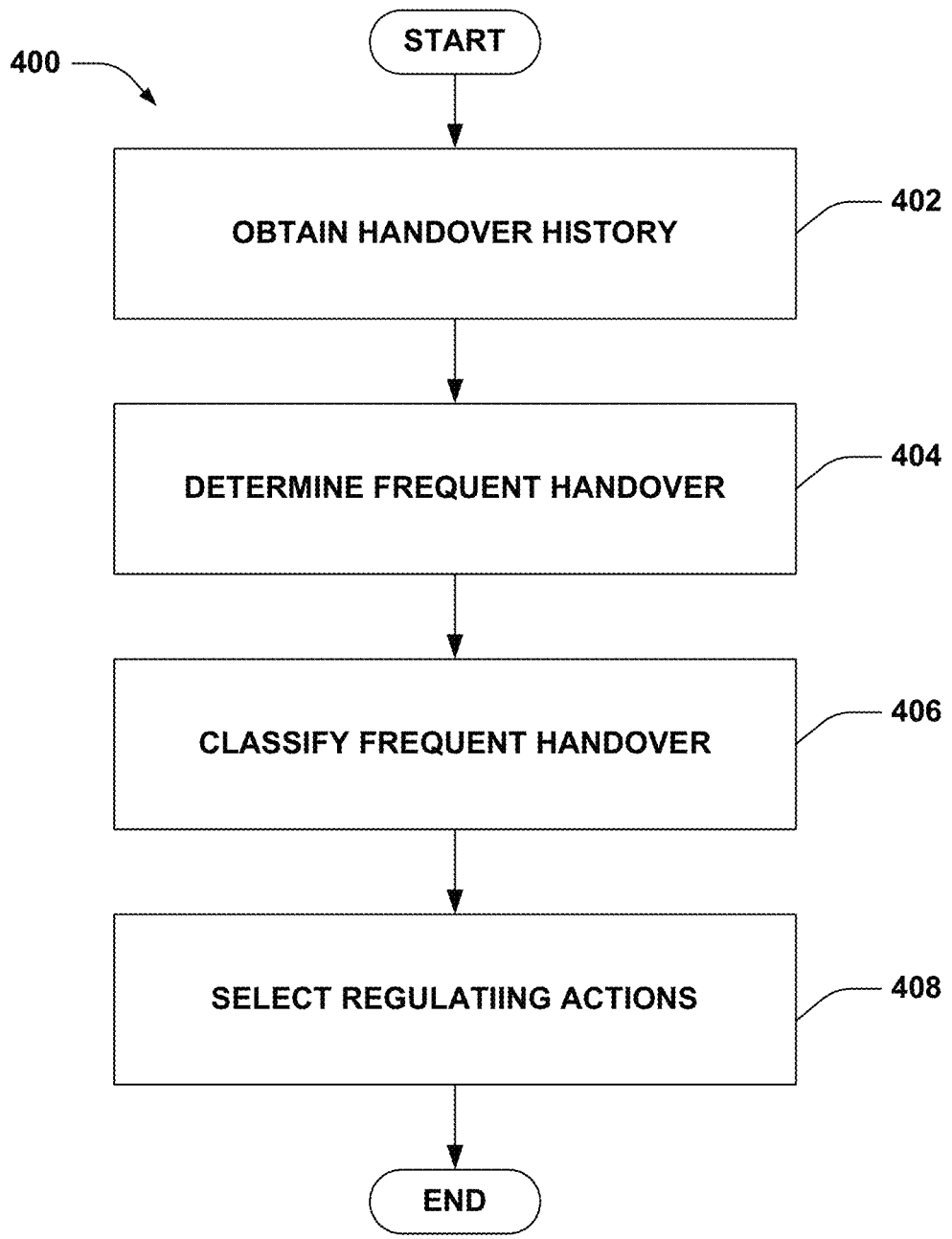
FIGS. 4A and 4B are flow charts of two aspects of example methodologies for regulating frequent handovers.
Figure 4B:
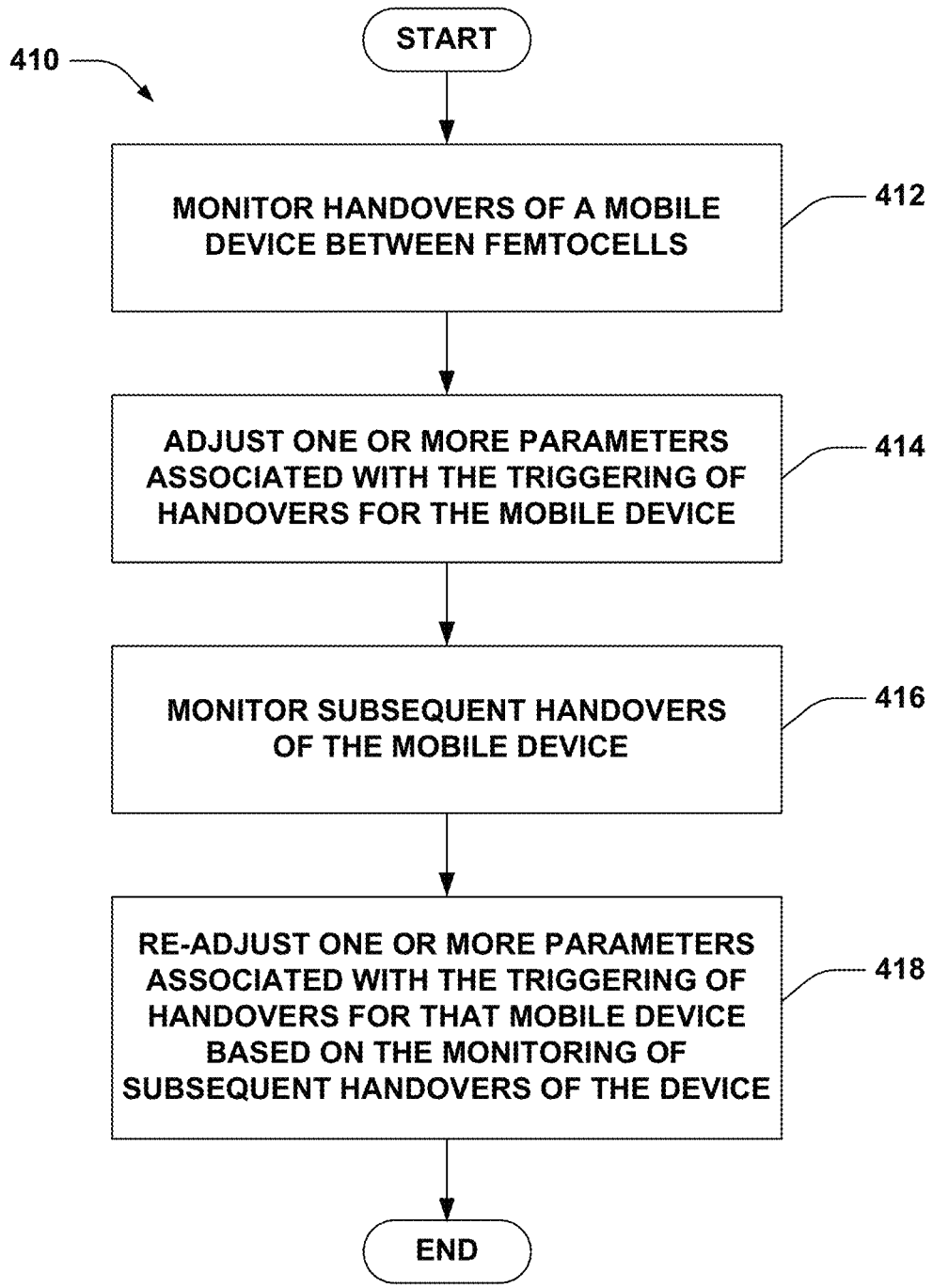

FIGS. 4A and 4B show example methodologies for regulation of frequent handovers between femtocells. While, for purposes of simplicity of explanation, the methodology is shown and described as a series of acts, it is to be understood and appreciated that the methodology is not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Turning to FIG. 4A, an example methodology 400 is displayed that facilitates regulation of frequent handovers. In an aspect, for example, methodology 400 may be defined in instructions stored on a femto node, such as femto node 202, or one or more components thereof, and executed by a processor to perform the described acts. At step 402, a femto node obtains handover history information for a mobile device which became recently connected to the femto node as a result of handover from an adjacent femto node or which is connected to the femto node but is going connect to an adjacent femto node as a result of handover. In one aspect, the device handover information can be obtained from "UE History Information" information element (IE), which can be passed during the handovers from the source femtocell to the target femtocell. This IE contains information for the femtocells (e.g., up to 16) that a mobile device has been served by in active state prior to the target cell. For each of these cells, IE contains cell identity, cell type (e.g., macro, femto, etc.) and the time mobile device stayed in that cell.

At step 404, the femto node determines based on the device handover history whether the mobile device is subject to frequent handovers. In one aspect, this determination may be based on an average handover time of the mobile device. For example, the femto node may calculate average time that the mobile device stayed in each femtocell over the last '$n_1$' cells. If the calculated 'average handover time' is less than a certain threshold parameter (e.g., a couple of seconds), then it may be concluded that the mobile device is going through frequent handovers. In another aspect, the femto node may determine frequent handover based on per handover time. For example, the femto node may check for last '$n_2$' cells if in each cell time spent under a cell <$T_{min}$, where $T_{min}$ is the time threshold below which a handover can be considered as a fast handover. If out of '$n_2$' last handovers, '$x_2$' were fast handovers, then the mobile device is considered going through frequent handovers.

At step 406, the femto node may classify the frequent handover as a ping-pong handover or fast moving handover. To determine whether the mobile device is going through a ping-pong handover, the femto node may first identify mobile device's past serving cells from the device's handover history and then check one or more of the following conditions: Condition 1—check if the last '$n_p$' handovers have happened between the cells, which are RF neighbors of the current cell; and Condition 2—check if in the last '$n_p$' handovers, the cell identity of a cell has repeated '$x_p$' times. The femto node may classify mobile device handovers as 'ping-pong' handovers if one or both of the above conditions are met. All other handovers that do not meet the Condition 1 or 2 of the ping-pong handovers may be classified as 'fast moving handovers'.

At step 408, the femto node may select handover regulation actions. For example, if handovers are 'frequent handovers' and are classified as 'fast moving handovers', then femto node can initiate inter-frequency or inter-RAT handover to a macrocell on the other carrier or radio technology. If handovers are 'frequent handovers' and are classified as 'ping-pong handovers', then femto node can make handover to the ping-ponging (or neighboring) cells, for this mobile device, more difficult by, for example, adjusting handover triggering parameters of the femtocell and/or mobile device. The femto node may also increase this difficulty level in steps, by adjusting handover triggering parameters of the femtocell and/or mobile device in steps. Alternatively, the femto node can delay handover to the cells involved in ping-pong handovers. If the above described frequent handover regulating actions do not work, then femtocell can initiate inter-frequency or inter-RAT handover to a collocated macrocell, as a fall back option.

Turning to FIG. 4B, another example methodology 410 is displayed that facilitates a multi-step regulation of frequent handovers. In an aspect, for example, methodology 410 may be defined in instructions stored on a femto node, such as femto node 202, or one or more components thereof, and executed by a processor to perform the described acts. At step 412, a femto node may monitor handovers between femtocells by a mobile device. At step 414, the femto node can adjust one or more parameters associated with the triggering of handovers for that mobile device based on monitoring. Examples of parameter adjustments are provided above. At step 416, the femto node may continue monitoring subsequent handovers of the mobile device. And, at step 418, the femto node may re-adjust one or more parameters associated with the triggering of handovers for that mobile device based on the monitoring of subsequent handovers of the mobile device. The adjusted/re-adjusted parameters may include, but not limited to, measurement identity, event identity, event type, measurement type, reporting interval, amount of reporting, threshold, hysteresis, Time-to-Trigger (TTT), filter coefficient, Cell Individual Offset (CIO), use CIO, Reporting Range Constant, cells for measurement, and compressed-mode parameters.

Generally, the methodology 410 facilitates adjustment/re-adjustment of handover trigger parameters to delay ping-pong handovers in several steps in order, for example, to make handovers more difficult. This may be especially helpful in cases of misclassification of the handover. That is, if a vehicular UE (e.g., a fast moving UE) is misclassified as ping-pong UE, then the handover triggering is not suddenly delayed too much, helping the call to survive. The methodology 410 also applicable in cases where detection of fast moving UE results in change of parameters to make handovers happen faster. In addition, the methodology 410 may be also used in cases when ping-ponging UE comes out of ping-pong region to adjust handover triggering parameters back to their original values, which were used before UE entered the ping-pong region.

Figure 5:
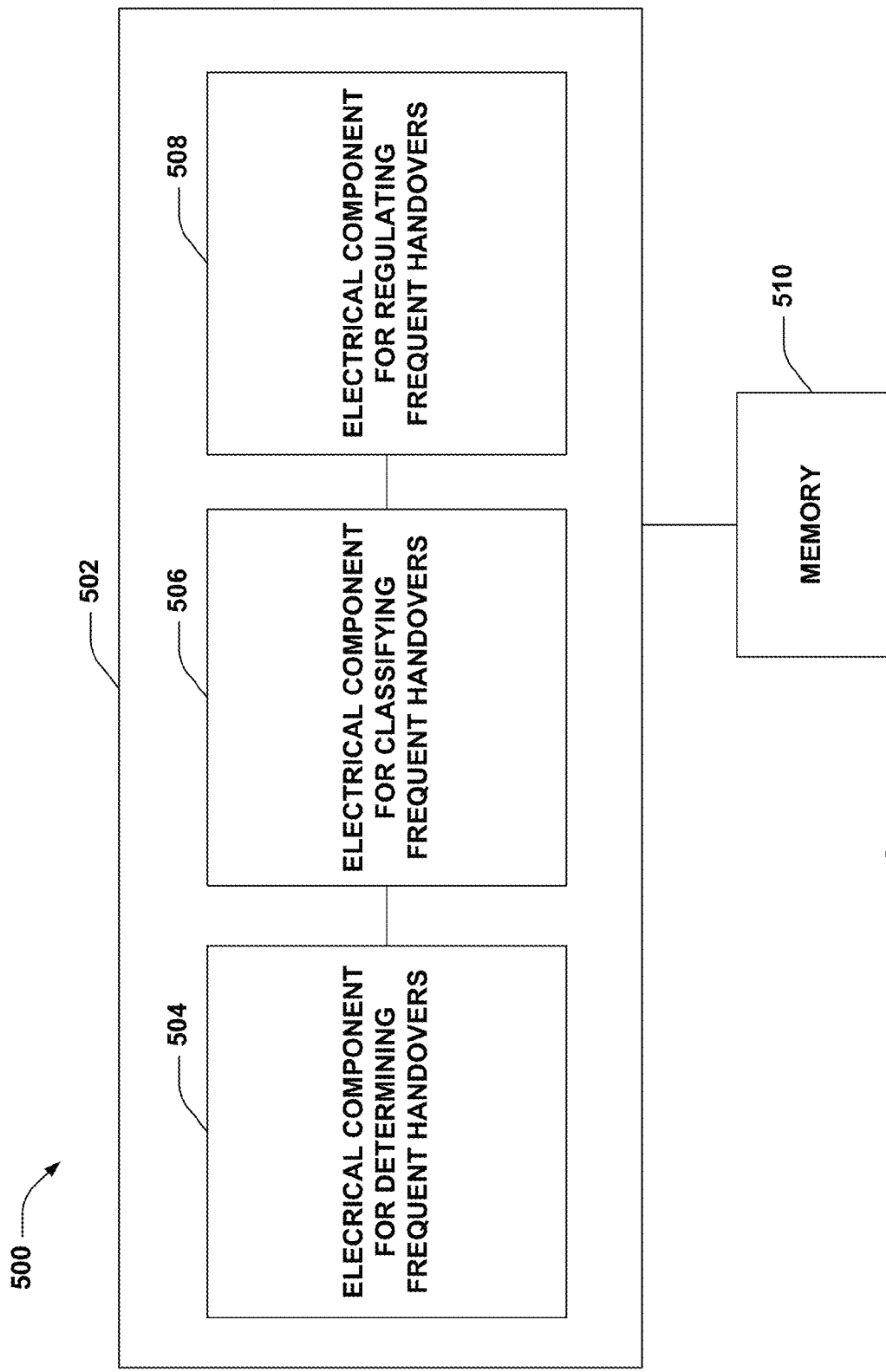
FIG. 5 is a block diagram of an example system that regulates frequent handovers.

FIG. 5 illustrates a system 500 for regulating frequent handovers. For example, system 500 can reside at least partially within a femto node. It is to be appreciated that system 500 is represented as including functional blocks, which can be functional blocks that represent functions implemented by a processor, software, or combination thereof (e.g., firmware) . System 500 includes a logical grouping 502 of electrical components that can act in conjunction. For instance, logical grouping 502 can include an electrical component 504 for determining frequent handovers using, for example, handover history of the mobile device. Further, logical grouping 502 can comprise an electrical component 506 for classifying frequent handovers as ping-pong handover or fast moving handover. Further, logical grouping 502 can include an electrical component 508 for regulating frequent handover based on handover classification.

Additionally, system 500 can include a memory 510 that retains instructions for executing functions associated with the electrical components 504, 506, and 508. While shown as being external to memory 510, it is to be understood that one or more of the electrical components 504, 506, and 508 can exist within memory 510. In one example, electrical components 504, 506, and 508 can comprise at least one processor, or each electrical component 504, 506, and 508 can be a corresponding module of at least one processor. Moreover, in an additional or alternative example, electrical components 504, 506, and 508 can be a computer program product comprising a computer readable medium, where each electrical component 504, 506, and 508 can be corresponding code.

Figure 6:
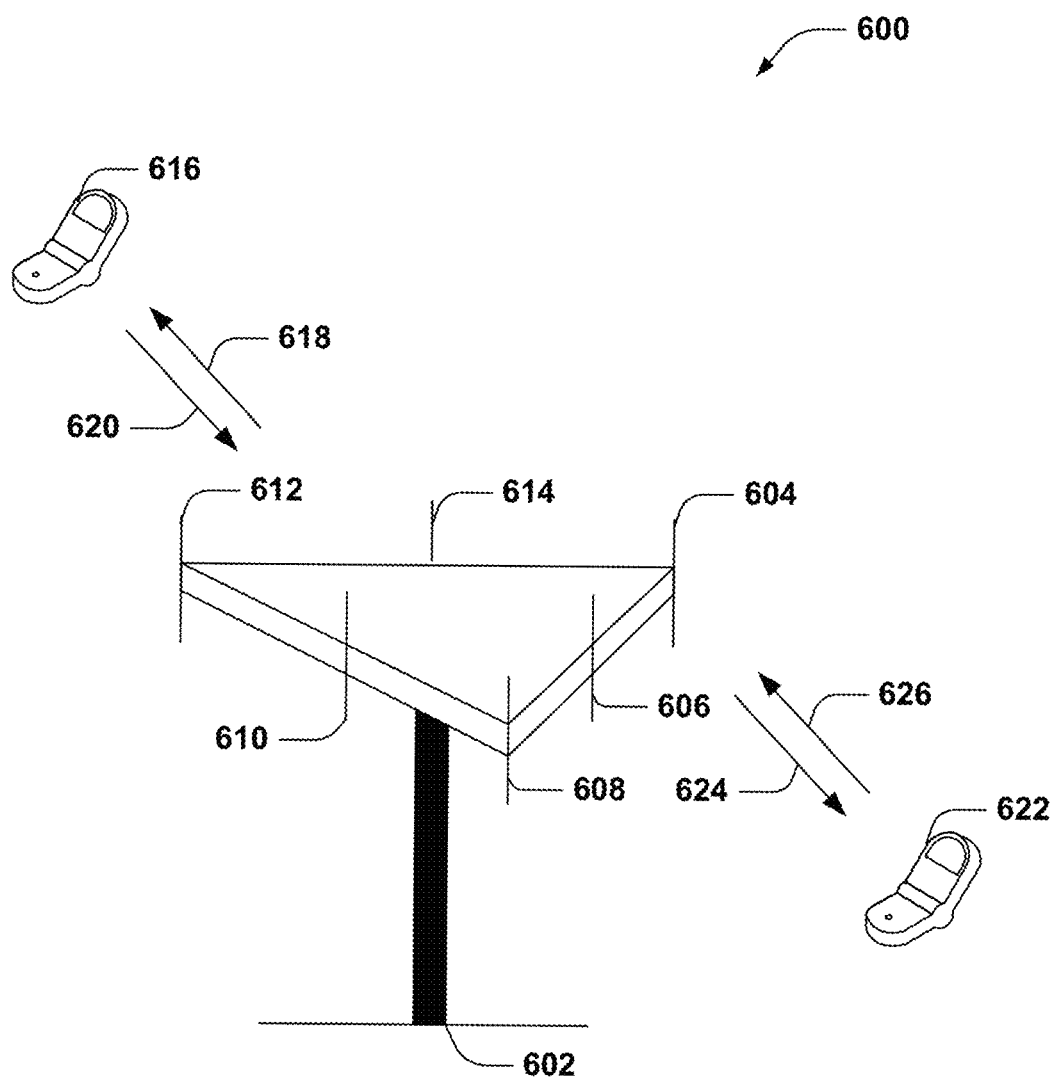
FIG. 6 is a block diagram of an example wireless communication system in accordance with various aspects set forth herein.

Referring now to FIG. 6, a wireless communication system 600 in which mechanisms for regulation of fast handover may be implemented. System 600 comprises a base station 602, which may be a femto node, such as nodes 102 or 202 or system 500, and may include the components and implement the functions described above with respect to FIGS. 1-5. In one aspect, base station 602 can include multiple antenna groups. For example, one antenna group can include antennas 604 and 606, another group can comprise antennas 608 and 610, and an additional group can include antennas 612 and 614. Two antennas are illustrated for each antenna group; however, more or fewer antennas can be utilized for each group. Base station 602 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 602 can communicate with one or more mobile devices such as mobile device 616 and mobile device 622; however, it is to be appreciated that base station 602 can communicate with substantially any number of mobile devices similar to mobile devices 616 and 622. Mobile devices 616 and 622 can be, for example, cellular phones, smart phones, laptops, handheld communication devices, handheld computing devices, satellite radios, global positioning systems, PDAs, and/or any other suitable device for communicating over wireless communication system 600. As depicted, mobile device 616 is in communication with antennas 612 and 614, where antennas 612 and 614 transmit information to mobile device 616 over a forward link 618 and receive information from mobile device 616 over a reverse link 620. Moreover, mobile device 622 is in communication with antennas 604 and 606, where antennas 604 and 606 transmit information to mobile device 622 over a forward link 624 and receive information from mobile device 622 over a reverse link 626. In a frequency division duplex (FDD) system, forward link 618 can utilize a different frequency band than that used by reverse link 620, and forward link 624 can employ a different frequency band than that employed by reverse link 626, for example. Further, in a time division duplex (TDD) system, forward link 618 and reverse link 620 can utilize a common frequency band and forward link 624 and reverse link 626 can utilize a common frequency band.

Each group of antennas and/or the area in which they are designated to communicate can be referred to as a sector of base station 602. For example, antenna groups can be designed to communicate to mobile devices in a sector of the areas covered by base station 602. In communication over forward links 618 and 624, the transmitting antennas of base station 602 can utilize beamforming to improve signal-to-noise ratio of forward links 618 and 624 for mobile devices 616 and 622. Also, while base station 602 utilizes beamforming to transmit to mobile devices 616 and 622 scattered randomly through an associated coverage, mobile devices in neighboring cells can be subject to less interference as compared to a base station transmitting through a single antenna to all its mobile devices. Moreover, mobile devices 616 and 622 can communicate directly with one another using a peer-to-peer or ad hoc technology as depicted. According to an example, system 600 can be a multiple-input multiple-output (MIMO) communication system.

Figure 7:
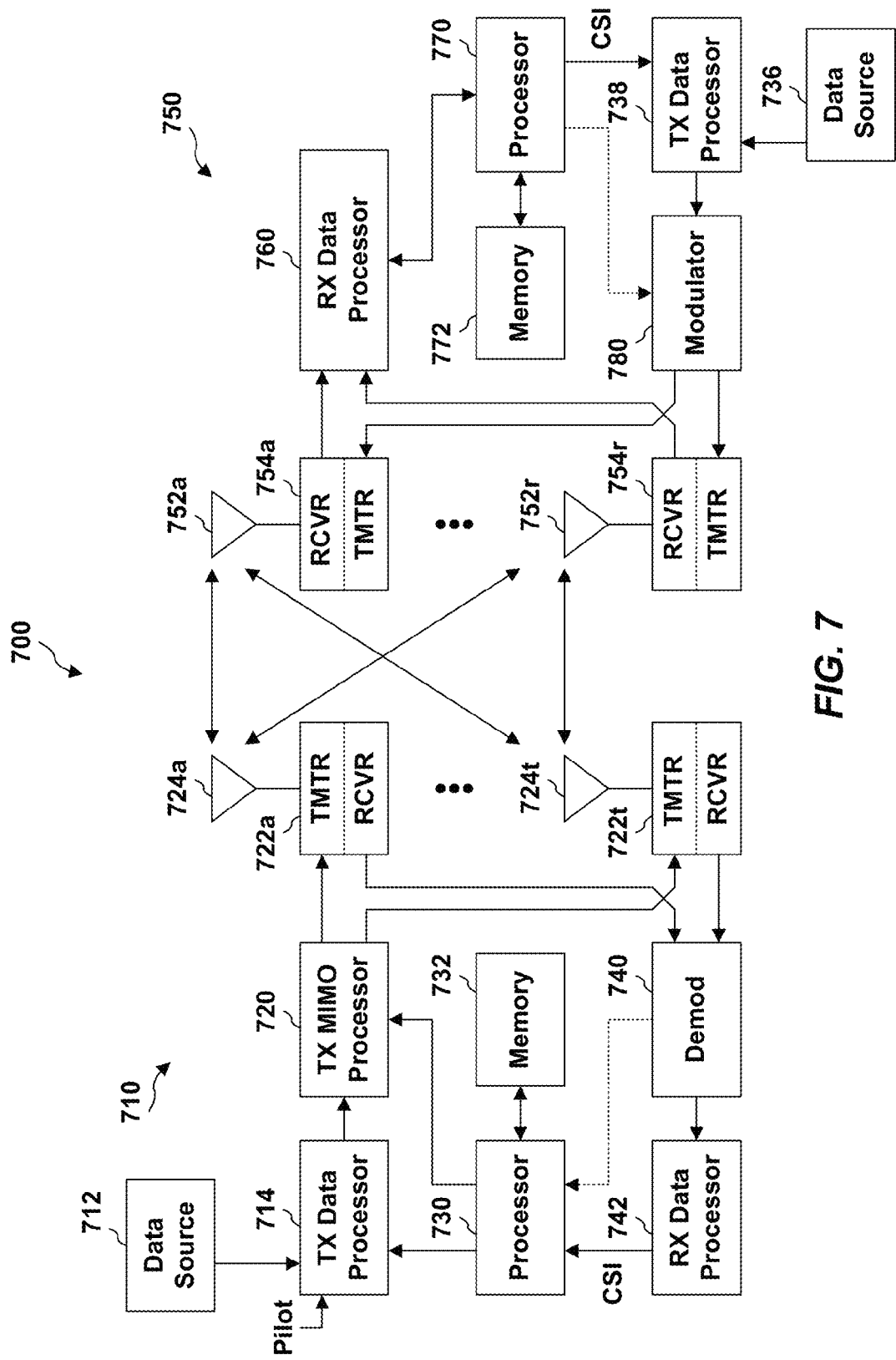
FIG. 7 is an illustration of an example wireless network environment that can be employed in conjunction with the various systems and methods described herein.

FIG. 7 shows an example wireless communication system 700. The wireless communication system 700 depicts one base station 710, which can include a femto node, and one mobile device 750 for sake of brevity. However, it is to be appreciated that system 700 can include more than one base station and/or more than one mobile device, wherein additional base stations and/or mobile devices can be substantially similar or different from example base station 710 and mobile device 750 described below. In addition, it is to be appreciated that base station 710 and/or mobile device 750 can employ the systems (FIGS. 1, 2, 3, 5, and 6) and/or methods (FIG. 4) described herein to facilitate wireless communication there between. For example, components or functions of the systems and/or methods described herein can be part of a memory 732 and/or 772 or processors 730 and/or 770 described below, and/or can be executed by processors 730 and/or 770 to perform the disclosed functions.

At base station 710, traffic data for a number of data streams is provided from a data source 712 to a transmit (TX) data processor 714. According to an example, each data stream can be transmitted over a respective antenna. TX data processor 714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 730.

The modulation symbols for the data streams can be provided to a TX MIMO processor 720, which can further process the modulation symbols (e.g., for OFDM). TX MIMO processor 720 then provides $N_T$ modulation symbol streams to $N_T$ transmitters (TMTR) 722a through 722t. In various embodiments, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 722a through 722t are transmitted from $N_T$ antennas 724a through 724t, respectively.

At mobile device 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective signal, digitizes the conditioned signal to provide samples, and further processes the samples to provide a corresponding "received" symbol stream.

An RX data processor 760 can receive and process the $N_R$ received symbol streams from $N_R$ receivers 754 based on a particular receiver processing technique to provide $N_T$ "detected" symbol streams. RX data processor 760 can demodulate, deinterleave, and decode each detected symbol stream to recover the traffic data for the data stream. The processing by RX data processor 760 is complementary to that performed by TX MIMO processor 720 and TX data processor 714 at base station 710.

The reverse link message can comprise various types of information regarding the communication link and/or the received data stream. The reverse link message can be processed by a TX data processor 738, which also receives traffic data for a number of data streams from a data source 736, modulated by a modulator 780, conditioned by transmitters 754a through 754r, and transmitted back to base station 710.

At base station 710, the modulated signals from mobile device 750 are received by antennas 724, conditioned by receivers 722, demodulated by a demodulator 740, and processed by a RX data processor 742 to extract the reverse link message transmitted by mobile device 750. Further, processor 730 can process the extracted message to determine which precoding matrix to use for determining the beamforming weights.

Processors 730 and 770 can direct (e.g., control, coordinate, manage, etc.) operation at base station 710 and mobile device 750, respectively. Respective processors 730 and 770 can be associated with memory 732 and 772 that store program codes and data. Processors 730 and 770 can also perform functionalities described herein to support selecting a paging area identifier for one or more femto nodes.

Figure 8:
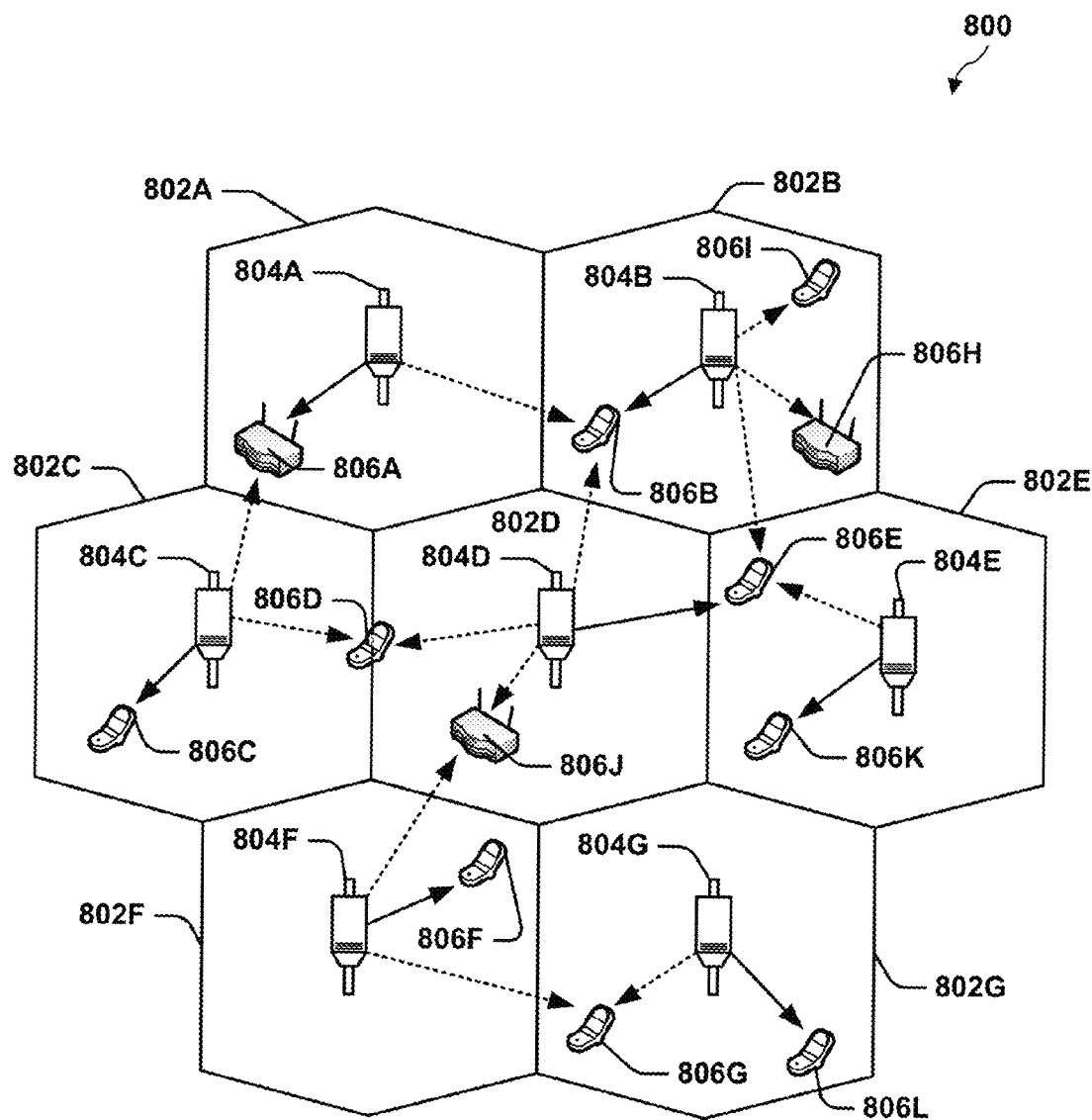
FIG. 8 illustrates an example wireless communication system, configured to support a number of devices, in which the aspects herein can be implemented.

FIG. 8 illustrates a wireless communication system 800, configured to support a number of users, in which the teachings herein may be implemented. The system 800 provides communication for multiple cells 802, such as, for example, macro cells 802A-802G, with each cell being serviced by a corresponding access node 804 (e.g., access nodes 804A-804G). As shown in FIG. 8, mobile devices 806 (e.g., mobile devices 806A-806L) can be dispersed at various locations throughout the system over time. Each mobile device 806 can communicate with one or more access nodes 804 on a forward link (FL) and/or a reverse link (RL) at a given moment, depending upon whether the mobile device 806 is active and whether it is in soft handoff, for example. The wireless communication system 800 can provide service over a large geographic region. In some aspects, some of the mobile devices 806, such as devices 806A, 806H, and 806J, may be femto nodes, such as nodes 102 or 202 or system 500, and may include the components and implement the functions described above with respect to FIGS. 1-5.

Figure 9:
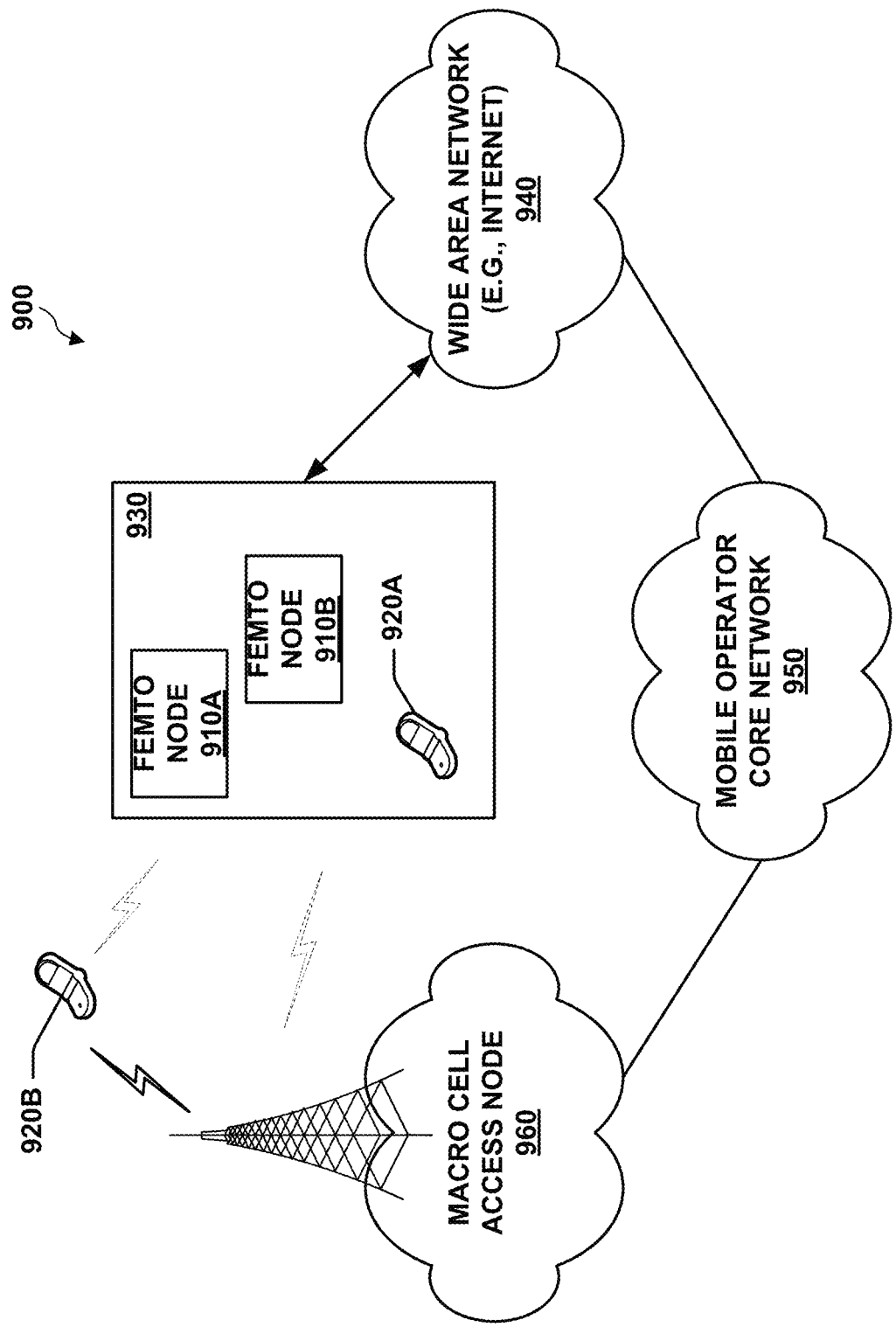
FIG. 9 is an illustration of an exemplary communication system to enable deployment of femtocells within a network environment.

FIG. 9 illustrates an exemplary communication system 900 where one or more femto nodes are deployed within a network environment. Specifically, the system 900 includes multiple femto nodes 910A and 910B (e.g., femtocell nodes or H(e)NB) installed in a relatively small scale network environment (e.g., in one or more user residences 930), which, in one aspect, may correspond to femto nodes 104, 106, 108, 110, and 112 of FIGS. 1-5. Each femto node 910 can be coupled to a wide area network 940 (e.g., the Internet) and a mobile operator core network 950 via a digital subscriber line (DSL) router, a cable modem, a wireless link, or other connectivity means (not shown). As will be discussed below, each femto node 910 can be configured to serve associated mobile devices 920 (e.g., mobile device 920A) and, optionally, alien mobile devices 920 (e.g., mobile device 920B). In other words, access to femto nodes 910 can be restricted such that a given mobile device 920 can be served by a set of designated (e.g., home) femto node(s) 910 but may not be served by any non-designated femto nodes 910 (e.g., a neighbor's femto node).

Figure 10:
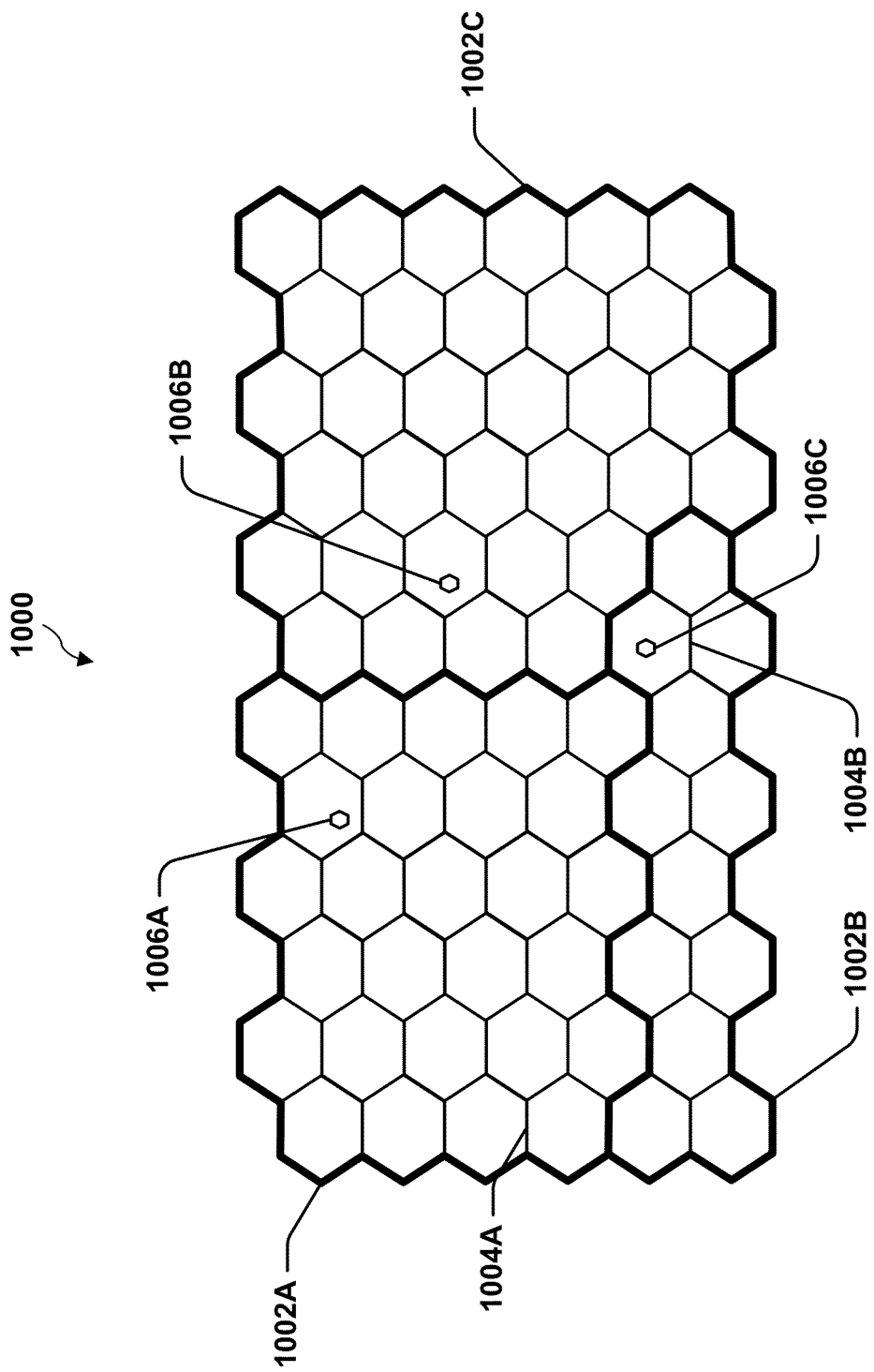
FIG. 10 illustrates an example of a coverage map having several defined tracking areas.

FIG. 10 illustrates an example of a coverage map 1000 where several tracking areas 1002 (or routing areas or location areas) are defined, each of which includes several macro coverage areas 1004. Here, areas of coverage associated with tracking areas 1002A, 1002B, and 1002C are delineated by the wide lines and the macro coverage areas 1004 are represented by the hexagons. The tracking areas 1002 also include femto coverage areas 1006 corresponding to respective femto nodes, such as nodes 102 or 202 or system 500, and which may include the components and implement the functions described above with respect to FIGS. 1-5. In this example, each of the femto coverage areas 1006 (e.g., femto coverage area 1006C) is depicted within a macro coverage area 1004 (e.g., macro coverage area 1004B). It should be appreciated, however, that a femto coverage area 1006 may not lie entirely within a macro coverage area 1004. In practice, a large number of femto coverage areas 1006 can be defined with a given tracking area 1002 or macro coverage area 1004. Also, one or more pico coverage areas (not shown) can be defined within a given tracking area 1002 or macro coverage area 1004.

Referring again to FIG. 9, the owner of a femto node 910 can subscribe to mobile service, such as, for example, 3G mobile service, offered through the mobile operator core network 950. In another example, the femto node 910 can be operated by the mobile operator core network 950 to expand coverage of the wireless network. In addition, a mobile device 920 can be capable of operating both in macro environments and in smaller scale (e.g., residential) network environments. Thus, for example, depending on the current location of the mobile device 920, the mobile device 920 can be served by a macro cell access node 960 or by any one of a set of femto nodes 910 (e.g., the femto nodes 910A and 910B that reside within a corresponding user residence 930). For example, when a subscriber is outside his home, he is served by a standard macro cell access node (e.g., node 960) and when the subscriber is at home, he is served by a femto node (e.g., node 910A). Here, it should be appreciated that a femto node 910 can be backward compatible with existing mobile devices 920.

A femto node 910 can be deployed on a single frequency or, in the alternative, on multiple frequencies. Depending on the particular configuration, the single frequency or one or more of the multiple frequencies can overlap with one or more frequencies used by a macro cell access node (e.g., node 960). In some aspects, an mobile device 920 can be configured to connect to a preferred femto node (e.g., the home femto node of the mobile device 920) whenever such connectivity is possible. For example, whenever the mobile device 920 is within the user's residence 930, it can communicate with the home femto node 910.

In some aspects, if the mobile device 920 operates within the mobile operator core network 950 but is not residing on its most preferred network (e.g., as defined in a preferred roaming list), the mobile device 920 can continue to search for the most preferred network (e.g., femto node 910) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the mobile device 920 can limit the search for specific band and channel. For example, the search for the most preferred system can be repeated periodically. Upon discovery of a preferred femto node, such as femto node 910, the mobile device 920 selects the femto node 910 for camping within its coverage area.

A femto node can be restricted in some aspects. For example, a given femto node can only provide certain services to certain mobile devices. In deployments with so-called restricted (or closed) association, a given mobile device can only be served by the macro cell mobile network and a defined set of femto nodes (e.g., the femto nodes 910 that reside within the corresponding user residence 930). In some implementations, a femto node can be restricted to not provide, for at least one mobile device, at least one of: signaling, data access, registration, paging, or service.

In some aspects, a restricted femto node (which can also be referred to as a Closed Subscriber Group H(e)NB) is one that provides service to a restricted provisioned set of mobile devices. This set can be temporarily or permanently extended as necessary. In some aspects, a Closed Subscriber Group (CSG) can be defined as the set of access nodes (e.g., femto nodes) that share a common access control list of mobile devices. A channel on which all femto nodes (or all restricted femto nodes) in a region operate can be referred to as a femto channel.

Various relationships can thus exist between a given femto node and a given mobile device. For example, from the perspective of a mobile device, an open femto node can refer to a femto node with no restricted association. A restricted femto node can refer to a femto node that is restricted in some manner (e.g., restricted for association and/or registration). A home femto node can refer to a femto node on which the mobile device is authorized to access and operate on. A guest femto node can refer to a femto node on which a mobile device is temporarily authorized to access or operate on. An alien femto node can refer to a femto node on which the mobile device is not authorized to access or operate on, except for perhaps emergency situations (e.g., 911 calls).

From a restricted femto node perspective, a home mobile device can refer to an mobile device that authorized to access the restricted femto node. A guest mobile device can refer to a mobile device with temporary access to the restricted femto node. An alien mobile device can refer to a mobile device that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given mobile device, and so on.

A wireless multiple-access communication system can simultaneously support communication for multiple wireless mobile devices. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for regulating handovers between access points, comprising:
    determining a mobile device is experiencing frequent handovers between the access points;
    determining a cause of the frequent handovers of the mobile device;
    classifying the frequent handovers of the mobile device based on the cause of the handovers, including classifying a frequent handover as a ping-pong handover or a fast moving device handover;
        wherein the frequent handover is classified as the ping-pong handover if a number of handovers occur between an access point which is a radio frequency (RF) neighbor of a current access point or if an access point identity repeats a number of times in the number of handovers;
        wherein the frequent handover is classified as the fast moving device handover when the frequent handover is not classified as the ping-pong handover; and
    regulating a frequency of handovers of the mobile device based on handover classification.

2. The method of claim 1, wherein classifying the frequent handovers further includes determining the frequency of handovers.

3. The method of claim 1, wherein determining the mobile device is experiencing frequent handovers between the access points includes:
    obtaining a handover history of the mobile device; and
    determining the mobile device is experiencing frequent handovers based on the handover history.

4. The method of claim 3, wherein determining the mobile device is experiencing frequent handovers based on the handover history includes:
    determining the mobile device is experiencing frequent handovers based on an average time spent by mobile device on past access points.

5. The method of claim 3, wherein determining the mobile device is experiencing frequent handovers based on the handover history includes:
    determining the mobile device is experiencing frequent handovers based on a time spent by the mobile device on one or more access points.

6. The method of claim 1, wherein regulating the frequency of handovers based on the handover classification includes:
    when the frequent handovers are classified as fast moving device handovers, initiating handover to a macrocell on another carrier or radio technology.

7. The method of claim 1, wherein regulating the frequency of handovers based on the handover classification includes:
    when the frequent handovers are classified as ping-pong handovers, adjusting one or more handover triggering parameters to delay triggering of handover by the mobile device or the access points.

8. The method of claim 7, wherein the delay in triggering of handover by the mobile device occurs for a subset of neighboring access points.

9. The method of claim 7, wherein the one or more parameters associated with the triggering of handover includes at least one of a measurement identity, an event identity, an event type, a measurement type, a reporting interval, an amount of reporting, a threshold, hysteresis, a Time-to-Trigger (TTT), a filter coefficient, a Cell Individual Offset (CIO), a Use CIO, a Reporting Range Constant, cells for measurement, and compressed-mode parameters, or a combination thereof.

10. The method of claim 1, further comprising:
initiating, by an access point, an inter-frequency or inter-RAT handover to a co-located macrocell.

11. An apparatus for regulating handovers between access points, comprising:
a processor configured to:
determine a mobile device is experiencing frequent handovers between the access points;
determine a cause of the frequent handovers of the mobile device;
classify the frequent handovers of the mobile device based on the cause of the handovers, including classifying a frequent handover as a ping-pong handover or a fast moving device handover;
wherein the frequent handover is classified as the ping-pong handover if a number of handovers occur between an access point which is a radio frequency (RF) neighbor of a current access point or if an access point identity repeats a number of times in the number of handovers;
wherein the frequent handover is classified as the fast moving device handover when the frequent handover is not classified as the ping-pong handover; and
regulate a frequency of handovers of the mobile device based on handover classification.

12. The apparatus of claim 11, wherein to classify the frequent handovers the processor is further configured to determine the frequency of handovers.

13. The apparatus of claim 11, wherein to determine the mobile device is experiencing frequent handovers between the access points, the processor is further configured to:
obtain a handover history of the mobile device; and
determine the mobile device is experiencing frequent handovers based on the handover history.

14. The apparatus of claim 13, wherein to determine the mobile device is experiencing frequent handovers based on the handover history, the processor is further configured to:
determine the mobile device is experiencing frequent handovers based on an average time spent by the mobile device on past access points.

15. The apparatus of claim 13, wherein to determine the mobile device is experiencing frequent handovers based on the handover history, the processor is further configured to:
determine the mobile device is experiencing frequent handovers based on a time spent by the mobile device on one or more access points.

16. The apparatus of claim 11, wherein to regulate the frequency of handovers based on the handover classification, the processor is further configured to:
when the frequent handovers are classified as fast moving device handovers, initiate a handover to a macrocell on another carrier or radio technology.

17. The apparatus of claim 11, wherein to regulate the frequency of handovers based on the handover classification, the processor is further configured to:
when the frequent handovers are classified as ping-pong handovers, adjust one or more handover triggering parameters to delay triggering of handover by the mobile device or the access points.

18. The apparatus of claim 17, wherein the delay in triggering of handover by the mobile device occurs for a subset of neighboring access points.

19. The apparatus of claim 17, wherein the one or more parameters associated with the triggering of handover include at least one of a measurement identity, an event identity, an event type, a measurement type, a reporting interval, an amount of reporting, a threshold, hysteresis, a Time-to-Trigger (TTT), a filter coefficient, a Cell Individual Offset (CIO), a Use CIO, a Reporting Range Constant, cells for measurement, compressed-mode parameters, or a combination thereof.

20. The apparatus of claim 11, wherein, if the frequency of handovers does not change substantially, the processor is further configured to initiate, by an access point, an inter-frequency or inter-RAT handover to a co-located macrocell.

21. An apparatus for regulating handovers between access points, comprising:
means for determining a mobile device is experiencing frequent handovers between the access points;
means for determining a cause of the frequent handovers of the mobile device;
means for classifying the frequent handovers based on the mobile device on a cause of the handovers, including means for classifying as a ping-pong handover or a fast moving device handover;
wherein the means for classifying classifies the frequent handover as the ping-pong handover if a number of handovers occur between an access point which is a radio frequency (RF) neighbor of a current access point or if an access point identity repeats a number of times in the number of handovers;
wherein the means for classifying classifies the frequent handover as the fast moving device handover when the frequent handover is not classified as the ping-pong handover; and
means for regulating a frequency of handovers of the mobile device based on handover classification.

22. The apparatus of claim 21, wherein the means for classifying the frequent handovers further includes means for determining the frequency of handovers.

23. The apparatus of claim 21, wherein the means for determining the mobile device is experiencing the frequent handovers between the access points includes:
means for obtaining a handover history of the mobile device; and
means for determining the mobile device is experiencing frequent handovers based on the handover history.

24. The apparatus of claim 21, wherein the means for regulating the frequency of handovers based on the handover classification includes:
means for, when frequent handovers are classified as fast moving device handovers, initiating a handover to a macrocell on another carrier or radio technology.

25. The apparatus of claim 21, wherein the means for regulating the frequency of handovers based on the handover classification includes:
means for, when frequent handovers are classified as ping-pong handovers, adjusting one or more handover triggering parameters to delay triggering of handover by the mobile device or the access points.

26. The apparatus of claim 21, further comprising means for, if the frequency of handovers does not change substantially, initiating, by an access point, an inter-frequency or inter-RAT handover to a co-located macrocell.

27. A non-transitory computer-readable medium storing computer executable code for regulating handovers between access points, comprising:

a first set of codes for determining a mobile device is experiencing frequent handovers between the access points;

a second set of codes for determining a cause of the frequent handovers of the mobile device;

a third set of codes for classifying the frequent handovers of the mobile device based on a cause of the handovers, including classifying a frequent handover as a ping-pong handover or a fast moving device handover;

wherein the third set of codes classifies the frequent handover as the ping-pong handover if a number of handovers occur between an access point which is a radio frequency (RF) neighbor of a current access point or if an access point identity repeats a number of times in the number of handovers;

wherein the third set of codes classifies the frequent handover as the fast moving device handover when the frequent handover is not classified as the ping-pong handover; and a fourth set of codes for regulating a frequency of handovers of the mobile device based on handover classification.

28. The computer-readable medium of claim 27, wherein the third set of codes for classifying the frequent handovers further includes a fifth set of codes for determining the frequency of handovers.

29. The computer-readable medium of claim 27, wherein the first set of codes for determining the mobile device is experiencing the frequent handovers between the access points includes:

a fifth set of codes for obtaining a handover history of the mobile device; and a sixth set of codes for determining the mobile device is experiencing frequent handovers based on the handover history.

30. The computer-readable medium of claim 27, wherein the fourth set of codes for regulating the frequency of handovers based on the handover classification includes:

a fifth set of codes for, when frequent handovers are classified as fast moving device handovers, initiating handover to a macrocell on another carrier or radio technology.

31. The computer-readable medium of claim 27, wherein the fourth set of codes for regulating the frequency of handovers based on the handover classification includes:

a fifth set of codes for, when the frequent handovers are classified as ping-pong handovers, adjusting one or more handover triggering parameters to delay triggering of handover by the mobile device or the access points.

32. The computer-readable medium of claim 27, further comprising a fifth set of codes for, if the frequency of handovers does not change substantially, initiating, by an access point, an inter-frequency or inter-RAT handover to a co-located macrocell.

33. A method for regulating handovers between access points, comprising:

monitoring handovers of a mobile device between the access points and determining the mobile device is experiencing ping-pong handovers, wherein a handover is classified as a ping-pong handover if a number of handovers occur between an access point which is a radio frequency (RF) neighbor of a current access point or if an access point identity is repeated a number of times in the number of handovers, and the handover is classified as a fast moving device handover when the handover is not classified as the ping-pong handover;

adjusting one or more parameters associated with triggering of handovers for the mobile device based on the monitoring;

monitoring subsequent handovers of the mobile device, wherein the monitoring of the subsequent handovers includes determining the mobile device is experiencing ping-pong handovers; and re-adjusting the one or more parameters associated with the triggering of handovers for the mobile device based on the monitoring of the subsequent handovers of the mobile device.

34. The method of claim 33, wherein the monitoring of the handovers and the determining the mobile device is experiencing the ping-pong handovers includes determining the mobile device is experiencing frequent handovers.

35. The method of claim 33, wherein the monitoring of the handovers and the determining the mobile device is experiencing the ping-pong handovers is based on a handover history of the mobile device.

36. The method of claim 33, wherein the adjusting one or more parameters includes sending a message to the mobile device.

37. The method of claim 36, wherein the message is a Measurement Control message.

38. The method of claim 33, wherein the re-adjusting one or more parameters includes sending a message to the mobile device.

39. The method of claim 38, wherein the message is a Measurement Control message.

40. The method of claim 33, wherein the one or more parameters associated with the triggering of handovers include at least one of a measurement identity, an event identity, an event type, a measurement type, a reporting interval, an amount of reporting, a threshold, hysteresis, a Time-to-Trigger (TTT), a filter coefficient, a Cell Individual Offset (CIO), a use CIO, a Reporting Range Constant, cells for measurement, compressed-mode parameters, or a combination thereof.

41. The method of claim 33, wherein the monitoring of the subsequent handovers includes determining the mobile device is experiencing frequent handovers.

42. The method of claim 33, wherein monitoring of the subsequent handovers is based on a handover history of the mobile device.

43. An apparatus for regulating handovers between access points, comprising:

a processor configured to:

monitor handovers of a mobile device between the access points and determine the mobile device is experiencing ping-pong handovers, wherein a handover is classified as a ping-pong handover if a number of handovers occur between an access point which is a radio frequency (RF) neighbor of a current access point or if an access point identity is repeated a number of times in the number of handovers, and the handover is classified as a fast moving device handover when the handover is not classified as the ping-pong handover;

adjust one or more parameters associated with triggering of handovers for the mobile device based on the monitoring;

monitor subsequent handovers of the mobile device, wherein the monitoring of the subsequent handovers includes determining the mobile device is experiencing ping-pong handovers; and re-adjust one or more parameters associated with the triggering of handovers for the mobile device based on the monitoring of the subsequent handovers of the mobile device.

44. The apparatus of claim 43, wherein to monitor the handovers and to determine the mobile device is experiencing the ping-pong handovers, the processor is further configured to determine the mobile device is experiencing frequent handovers.

45. The apparatus of claim 43, wherein the processor is configured to monitor the handovers and to determine the mobile device is experiencing the ping-pong handovers based on a handover history of the mobile device.

46. The apparatus of claim 43, wherein to adjust the one or more parameters, the processor is further configured to send a message to the mobile device.

47. The apparatus of claim 46, wherein the message is a Measurement Control message.

48. The apparatus of claim 43, wherein to re-adjust the one or more parameters, the processor further configured to send a message to the mobile device.

49. The apparatus of claim 48, wherein the message is a Measurement Control message.

50. The apparatus of claim 43, wherein the one or more parameters associated with the triggering of handovers include at least one of a measurement identity, a event identity, a event type, a measurement type, a reporting interval, an amount of reporting, a threshold, a hysteresis, a Time-to-Trigger (TTT), a filter coefficient, a Cell Individual Offset (CIO), a use CIO, a Reporting Range Constant, cells for measurement, compressed-mode parameters, or a combination thereof.

51. The apparatus of claim 43, wherein to monitor the subsequent handovers, the processor is further configured to determine the mobile device is experiencing frequent handovers.

52. The apparatus of claim 43, wherein the processor is configured to monitor the subsequent handovers based on the handover history of the mobile device.

53. An apparatus for regulating handovers between access points, comprising:
means for monitoring handovers of a mobile device between the access points and determining the mobile device is experiencing ping-pong handovers, wherein a handover is classified as a ping-pong handover if a number of handovers occur between an access point which is a radio frequency (RF) neighbor of a current access point or if an access point identity is repeated a number of times in the number of handovers, and the handover is classified as a fast moving device handover when the handover is not classified as the ping-pong handover;
means for adjusting one or more parameters associated with triggering of handovers for the mobile device based on said monitoring;
means for monitoring subsequent handovers of the mobile device, wherein the monitoring of the subsequent handovers includes determining the mobile device is experiencing ping-pong handovers; and
means for re-adjusting one or more parameters associated with the triggering of handovers for the mobile device based on the monitoring of the subsequent handovers of the mobile device.

54. The apparatus of claim 53, wherein the means for monitoring the handovers and determining the mobile device is experiencing the ping-pong handovers includes means for determining the mobile device is experiencing frequent handovers.

55. The apparatus of claim 53, wherein the means for adjusting the one or more parameters include means for sending a message to the mobile device.

56. The apparatus of claim 55, wherein the message is a Measurement Control message.

57. The apparatus of claim 53, wherein the one or more parameters associated with the triggering of handovers include at least one of a measurement identity, a event identity, an event type, a measurement type, a reporting interval, an amount of reporting, a threshold, a hysteresis, a Time-to-Trigger (TTT), a filter coefficient, a Cell Individual Offset (CIO), a use CIO, a Reporting Range Constant, cells for measurement, compressed-mode parameters, or a combination thereof.

58. A non-transitory computer-readable medium storing computer executable code for regulating handovers between access points, comprising:
a first set of codes for monitoring handovers of a mobile device between the access points and determining the mobile device is experiencing ping-pong handovers, wherein a handover is classified as a ping-pong handover if a number of handovers occur between an access point which is a radio frequency (RF) neighbor of a current access point or if an access point identity is repeated a number of times in the number of handovers, and the handover is classified as a fast moving device handover when the handover is not classified as the ping-pong handover;
a second set of codes for adjusting one or more parameters associated with triggering of handovers for the mobile device based on the monitoring;
a third set of codes for monitoring subsequent handovers of the mobile device, wherein the monitoring of the subsequent handovers includes determining the mobile device is experiencing ping-pong handovers; and
a fourth set of codes for re-adjusting one or more parameters associated with the triggering of handovers for the mobile device based on the monitoring of the subsequent handovers of the mobile device.

59. The computer-readable medium of claim 58, wherein the first set of codes for the monitoring of the handovers and determining the mobile device is experiencing the ping-pong handovers include a fifth set of codes for determining the mobile device is experiencing frequent handovers.

60. The computer-readable medium of claim 58, wherein the second set of codes for adjusting the one or more parameters include a fifth set of codes for sending a message to the mobile device.

61. The computer-readable medium of claim 60, wherein the message is a Measurement Control message.

62. The computer-readable medium of claim 58, wherein the one or more parameters associated with the triggering of handovers include at least one of a measurement identity, an event identity, an event type, a measurement type, a reporting interval, an amount of reporting, a threshold, a hysteresis, a Time-to-Trigger (TTT), a filter coefficient, a Cell Individual Offset (CIO), a use CIO, Reporting Range Constant, cells for measurement, compressed-mode parameters, or a combination thereof.

* * * * *